US006193316B1

(12) United States Patent
Janke et al.

(10) Patent No.: US 6,193,316 B1
(45) Date of Patent: Feb. 27, 2001

(54) VEHICLE SEAT WITH BACKREST PART ADJUSTMENT

(75) Inventors: Astrid Janke, Sindelfingen (DE); Miroslav Jiskra, Prague (CZ)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 09/472,521

(22) Filed: Dec. 27, 1999

(30) Foreign Application Priority Data

Dec. 24, 1998 (DE) .............................................. 198 60 228

(51) Int. Cl.[7] ............................................................. B60N 2/22
(52) U.S. Cl. ....................................... 297/362.11; 297/362
(58) Field of Search ............................... 297/361.1, 362, 297/362.11, 366

(56) References Cited

U.S. PATENT DOCUMENTS

| 185,189 | * | 12/1876 | Platt | 297/362 |
|---|---|---|---|---|
| 242,170 | * | 5/1881 | Van Pelt | 297/362 |
| 3,583,762 | | 6/1971 | Strien | 297/361 |
| 5,203,532 | | 4/1993 | Matsuura | 248/394 |
| 5,295,730 | * | 3/1994 | Rees | 297/362.11 |
| 5,435,624 | * | 7/1995 | Bray et al. | 297/362 X |
| 5,702,155 | * | 12/1997 | Ito | 297/362.11 |

* cited by examiner

*Primary Examiner*—Peter R. Brown
(74) *Attorney, Agent, or Firm*—Evenson, McKeown, Edwards & Lenahan, P.L.L.C.

(57) ABSTRACT

A vehicle seat has a seat part and a backrest part swivellably arranged thereon as well as an adjusting device for adjusting the inclination of the backrest part. The backrest adjusting device including at least one rod element which is arranged crosswise in the transition area between the backrest part and the seat part and is supported with its upper end on the backrest part and with its lower end on the seat part. The rod element is a control-arm-type lever whose upper end is coupled to the backrest part with respect to movements and whose lower end can be displaced for adjusting the inclination of the backrest part by a driving mechanism along a circular-arc-shaped path between end positions.

2 Claims, 6 Drawing Sheets

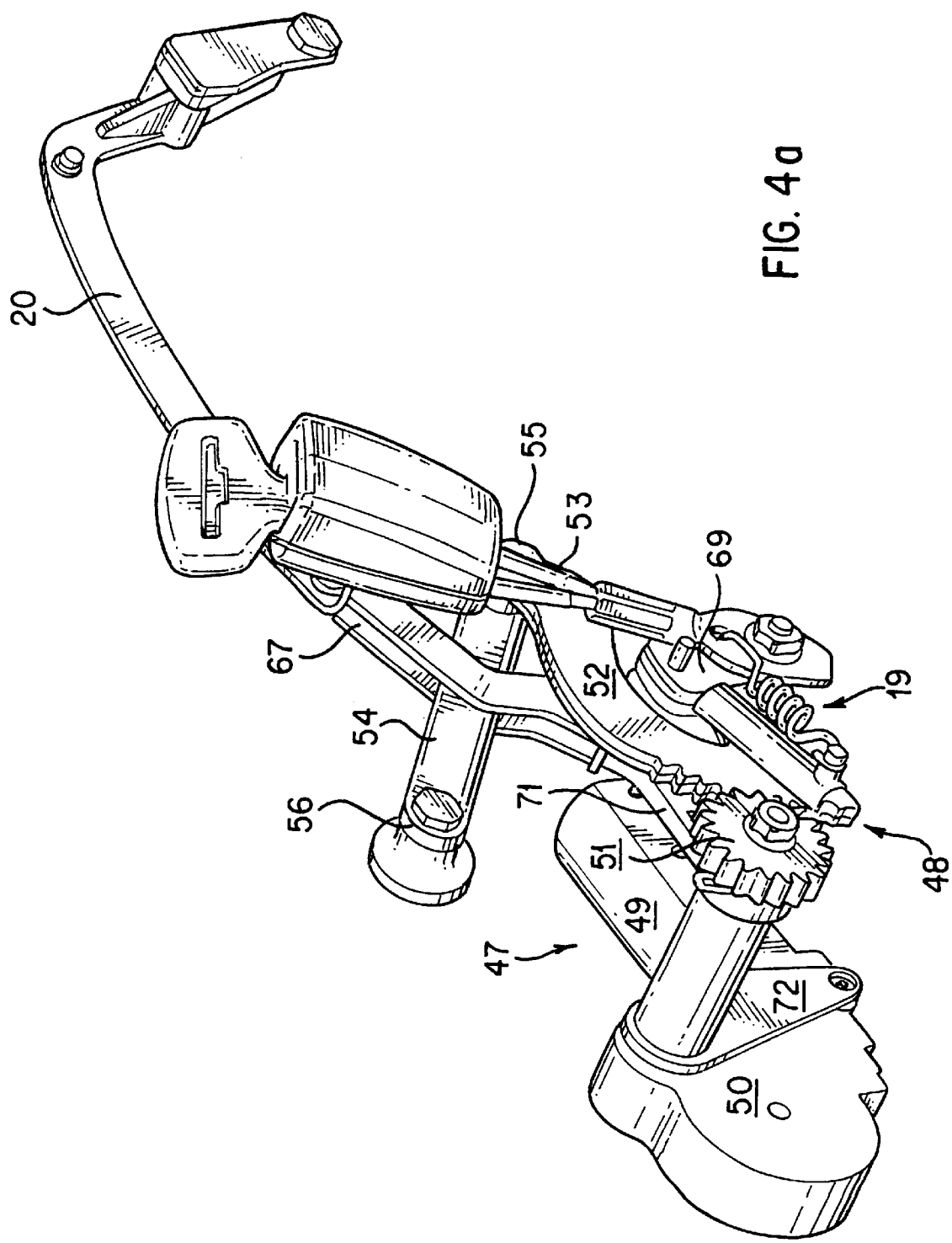

VEHICLE SEAT WITH BACKREST PART ADJUSTMENT

This application claims priority of 198 60 228.6-16, filed Dec. 24, 1998, the disclosure of which is expressly incorporated by reference herein.

BACKGROUND OF THE INVENTION

The present invention relates to a vehicle seat having a seat part and a backrest part swivellably arranged thereon as well as a backrest adjusting device for adjusting the inclination of the backrest part. The backrest adjusting device comprises at least one rod element which is arranged crosswise in the transition area between the backrest part and the seat part and is supported with its upper end on the backrest part and with its lower end on the seat part. The rod element is a control-arm-type lever whose upper end is coupled to the backrest part with respect to movements and whose lower end can be displaced for adjusting the inclination of the backrest part by means of a driving mechanism along a circular-arc-shaped path (KH) between end positions.

DE-OS 22 40 692 illustrates a vehicle seat having a seat part and a backrest part which is swivellably arranged thereon. A backrest adjusting device is provided which has at least one rod element in the form of a control-arm-type lever for adjusting the inclination of the backrest part. This control-arm-type lever is arranged crosswise in the transition area between the backrest part and the seat part. The upper end of the control-arm-type lever is supported on the backrest part and is coupled thereto with respect to movements. The lower end of the control-arm-type lever is supported by a driving mechanism on the seat part. For adjusting the inclination of the backrest part, the driving mechanism comprises a rocker which can be swivelled in the manner of a crank by a transmission, and to which the lower end of the control-arm-type lever is connected in an articulated manner and can be displaced along a circular arc between end positions. Together with the control-arm-type lever, the rocker forms a type of toggle lever drive.

It is a disadvantage of this known vehicle seat that the rocker, which can be swivelled by the transmission, must be arranged at a considerable distance in front of the backrest, so that the toggle lever drive has a lever effect which is suitable for adjusting the inclination of the backrest part. As a result, a relatively large amount of space is required on the vehicle seat. This requirement disadvantageously impairs the vehicle occupant's sitting comfort.

DE 17 55 333 C3 (corresponding to U.S. Pat. No. 3,583, 762) shows a vehicle seat constructed as a bucket seat, and having a seat part and a backrest part which is swivellably arranged thereon. For adjusting the inclination of the backrest part, this vehicle seat comprises a backrest adjusting device with at least one rod element which is arranged crosswise in the transition area between the backrest part and the seat part. For this purpose, the rod element, which is constructed as a threaded spindle, engages by its upper and lower end respectively. The threaded nuts are arranged on the backrest part and the seat part of the vehicle seat and have threads in opposite directions. By rotating the threaded spindle by way of a hand wheel fastened thereto, the spacing of the threaded nuts arranged on the seat part and the backrest part can be changed and the inclination of the backrest part can thereby be adjusted with respect to the seat part.

In this known vehicle seat, the adjustment of the inclination of the seat part by rotating the threaded spindle is, however, not very comfortable. In addition, the threaded spindle requires a relatively large amount of space, in which case, laterally in the area between the seat part and the backrest part, the seat cheeks and backrest must be cut out to a relatively large extent in order to ensure a free accessibility to the hand wheel of the threaded spindle. In one embodiment in which threaded rods are provided on both sides of the vehicle seat, no protection device is provided with respect to a non-uniform rotation of both threaded rods so it is possible that the two rod elements may be deformed.

SUMMARY OF THE INVENTION

An object of the present invention is to provide a vehicle seat which permits a comfortable adjustment of the backrest part and a compact space-saving arrangement of the backrest adjusting device in the transition area between the backrest part and the seat part.

According to the invention, this object has been achieved by providing a vehicle seat in which an end of a curved toothed rack is linked to the lever, and a driving pinion of the driving mechanism engages with the toothed rack, by means of which driving pinion the toothed rack can be swivelled about the center point (axis ZZ) of the circular-arc-shaped path (KH).

In the vehicle seat according to the present invention, an end of a curved toothed rack is linked to the lever, and a driving pinion of a driving mechanism is engaged with the toothed rack. A particularly space-saving and robust arrangement of the backrest adjusting device is achieved which, particularly also in the case of a vehicle seat with a narrow cushioning thickness, as, for example, in the case of a bucket seat, can be used in the transition area between the backrest part and the seat part. Because the lower end of the lever can be moved by the toothed rack along the circular-arc-shaped path, the backrest part can be adjusted in a relatively uniform manner and, as a result, can be driven particularly well by a motor, with the driving mechanism with the motor preferably being arranged below the seat part. The lateral incisions between the seat part and the backrest part can be dimensioned to be relatively small, because only the swivellability of the backrest part must be ensured. In addition, the lever is arranged in space-saving manner crosswise in the transition area between the backrest part and the seat part and is covered by a simply constructed covering.

In a further development of the invention, it has been found particularly advantageous to use two synchronously movable levers, in which because of the distributed forces, the backrest adjusting device can be dimensioned to be relatively small and simultaneously a reliable drive of the backrest part can be provided.

If, relative to the side contour of the seat part, the levers are arranged to be rebounding at least in areas, a seat of relatively narrow construction is achieved.

In addition, it has been found advantageous to link the levers to bent side cheeks of the backrest part. As a result, a spacing of moments between the respective upper end of the levers and the swivelling axis or the connection section, which is required for adjusting the inclination, can be selected particularly advantageously.

In a still further embodiment of the invention, the seat part has a passage opening for the assigned lever in lateral edge areas, so that the driving mechanism can be arranged in a space-saving manner below the seat part. If the seat part and the backrest part are connected with one another by a bending-elastic connection section, a fixed swivelling axis between the seat part and the backrest part will be unnecessary.

Finally, if the carrying structure of the seat part and backrest part as well as of the connection section is constructed in one piece, the bucket seat can be produced in a particularly simple and stable manner. In this embodiment, lateral incisions, which reduce the bending resistance, are provided in the area of the connection section, in order to ensure a smooth running adjustment of the inclination of the backrest part.

BRIEF DESCRIPTION OF THE DRAWINGS

Other objects, advantages and novel features of the present invention will become apparent from the following detailed description of the invention when considered in conjunction with the accompanying drawings.

FIG. 3b is an enlarged side view of the backrest adjusting device of the vehicle seat according to the invention according to the detail IIIb in FIG. 3a;

FIG. 4a is a perspective view of the backrest adjusting device of the vehicle seat according to the invention; and FIG. 4b is an exploded view of the backrest adjusting device according to FIGS. 4a.

DETAILED DESCRIPTION OF THE DRAWINGS

Figure 1:
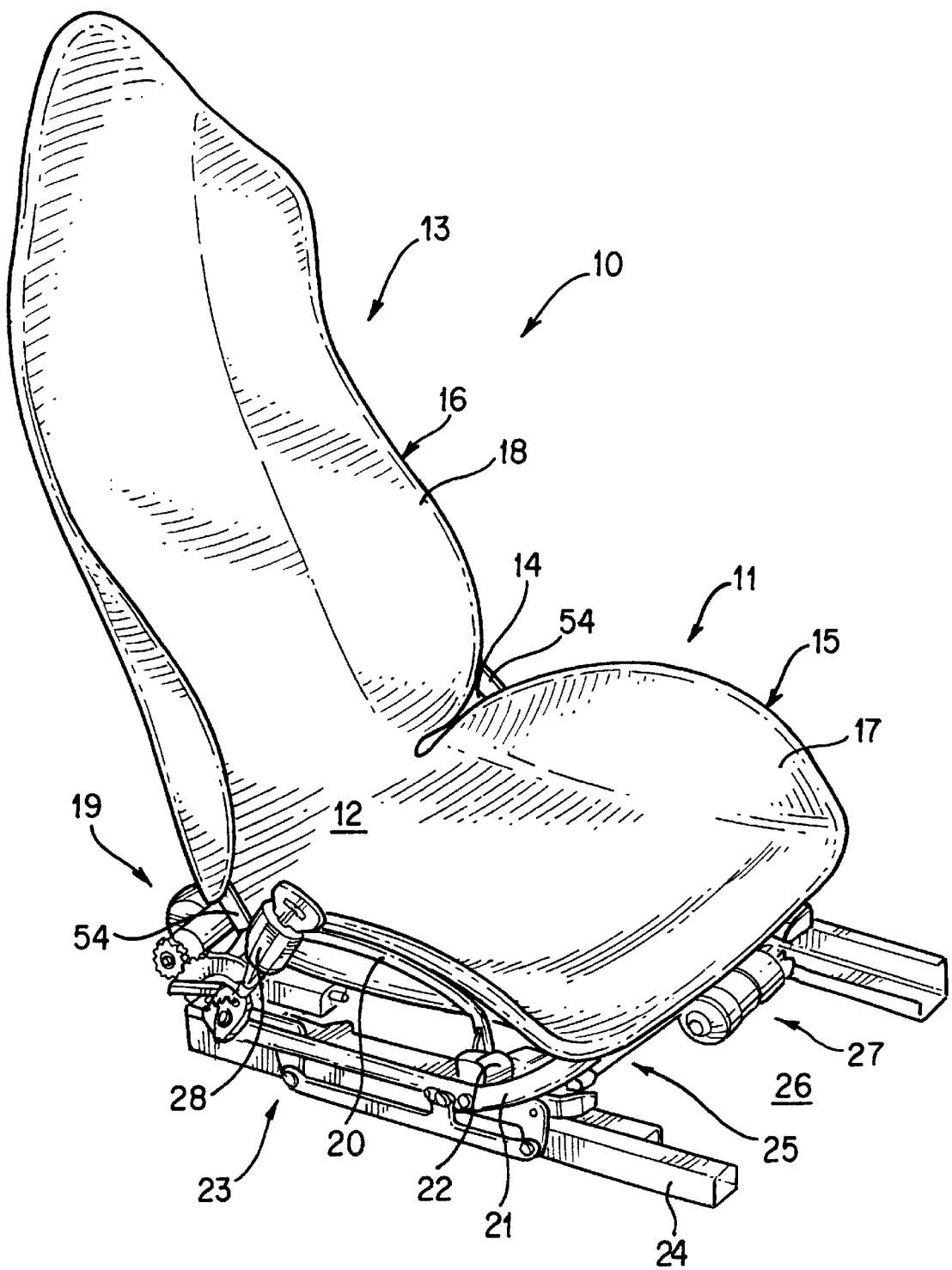
FIG. 1 is a perspective view of a vehicle seat according to a preferred embodiment of the invention.

FIG. 1 illustrates a vehicle bucket seat 10 which has a bucket-shaped seat part 11 and a backrest part 13. By way of a bending-elastic connection section 12, the backrest part 13 is swivellably arranged on the seat part 11. The seat part 11, the connection section 12 and the backrest part 13 form a one-piece seat bucket made of a fiber composite, in case the seat part and backrest part 11, 13 as well as the connection section 12 are covered by a cushioning adapted thereto.

In order to permit a smooth-running adjustment of the inclination of the backrest part 13, the seat bucket is provided with lateral incisions 14 which reduce the bending resistance of the connection section 12. The lateral edge areas 15, 16 of the seat part 11 and of the backrest part 13 are shaped as bent side cheeks 17, 18 which provide the vehicle occupant with a lateral hold. In the area of the lateral incisions 14 in the connection section 12, a portion of the backrest adjusting device 19 for adjusting the inclination of the backrest part 13 is visible, which will be explained in detail in the following with reference to FIGS. 2 to 4b.

The seat part 11 of the vehicle seat 10 comprises one laterally arranged supporting yokes 20 respectively which, by way of a spring arrangement 21 with four spiral springs 22 arranged laterally in the front and the rear, are supported on a seat subframe. The vehicle seat 10 and the seat subframe 23 are longitudinally adjustable by a longitudinal adjusting arrangement 25 in the guide rails 24 which are arranged in parallel to one another on the floor 26 a motor vehicle. A height adjusting arrangement 27, to which reference will be made in detail particularly with reference to FIG. 2, allows the vehicle seat 10 to also be electrically vertically adjusted and locked at the adjusted height. Only a buckle 28 of a seat belt system is visible. The buckle 28 is fastened on one side of the vehicle seat 10 on the seat subframe 23. A known type of fitting is fastened for fixing an end of the seat belt on the side facing away from the buckle 28 on the seat subframe 23.

Figure 2:
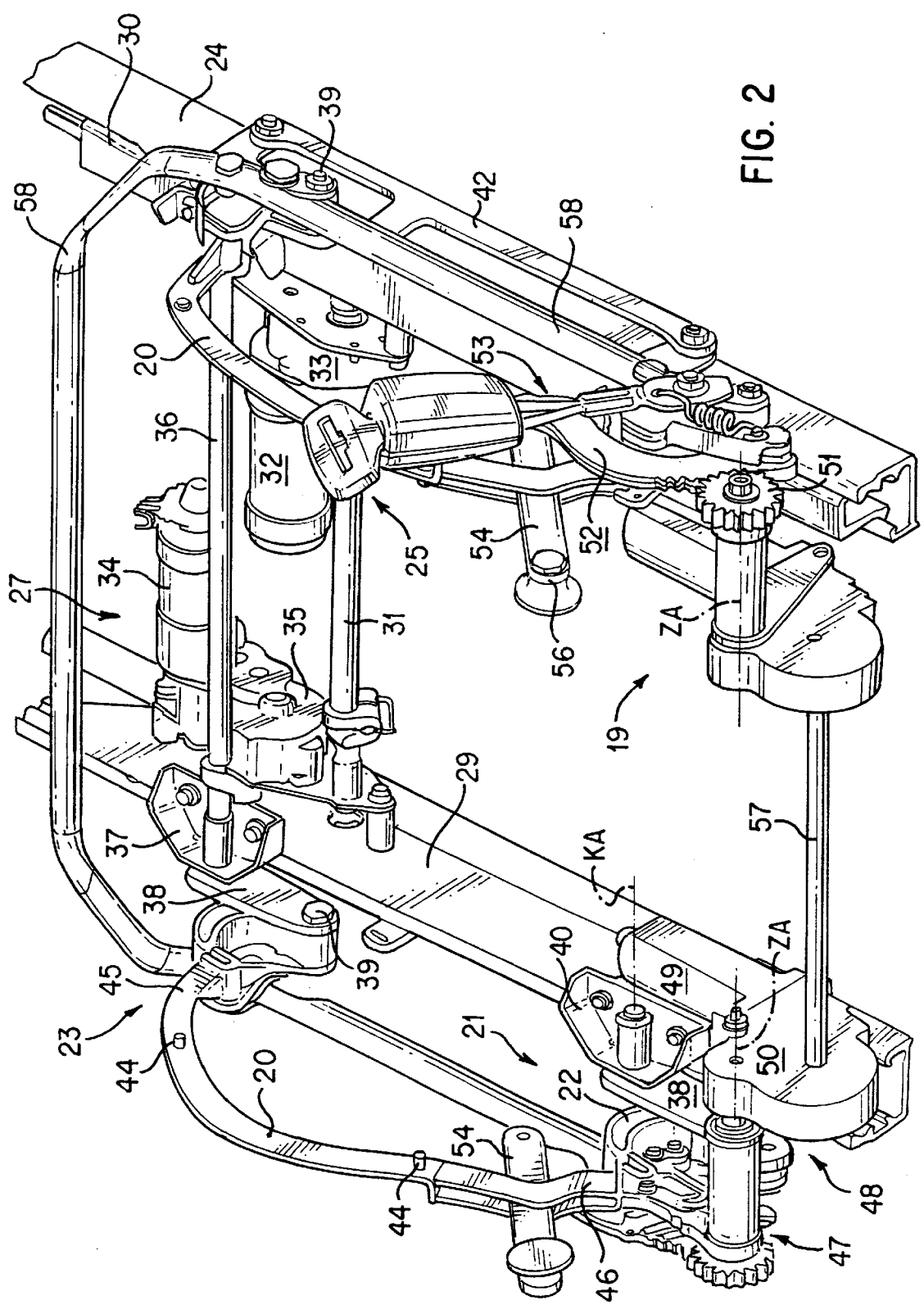
FIG. 2 is a perspective view of a seat subframe with a backrest adjusting device and a spring arrangement of the vehicle seat according to the invention.

FIG. 2 is a perspective view of the seat subframe 23 with a respective interior rail 29, 30 which is longitudinally displaceably guided by the guide rails 24. Between the interior rails 29, 30, a shaft 31 is drivingly arranged and locked by a motor 32 which is fixed on one of the interior rails 29, 30 and has a transmission 33 of the longitudinal adjusting arrangement 25. For this purpose, a respective known type of gear wheel respectively is fastened to the ends of the shaft 31 rotationally disposed in the interior rails 29, 30. The gear wheel meshes with a toothed rack in a known manner and is fastened to the guide rail 14.

Figure 3A:
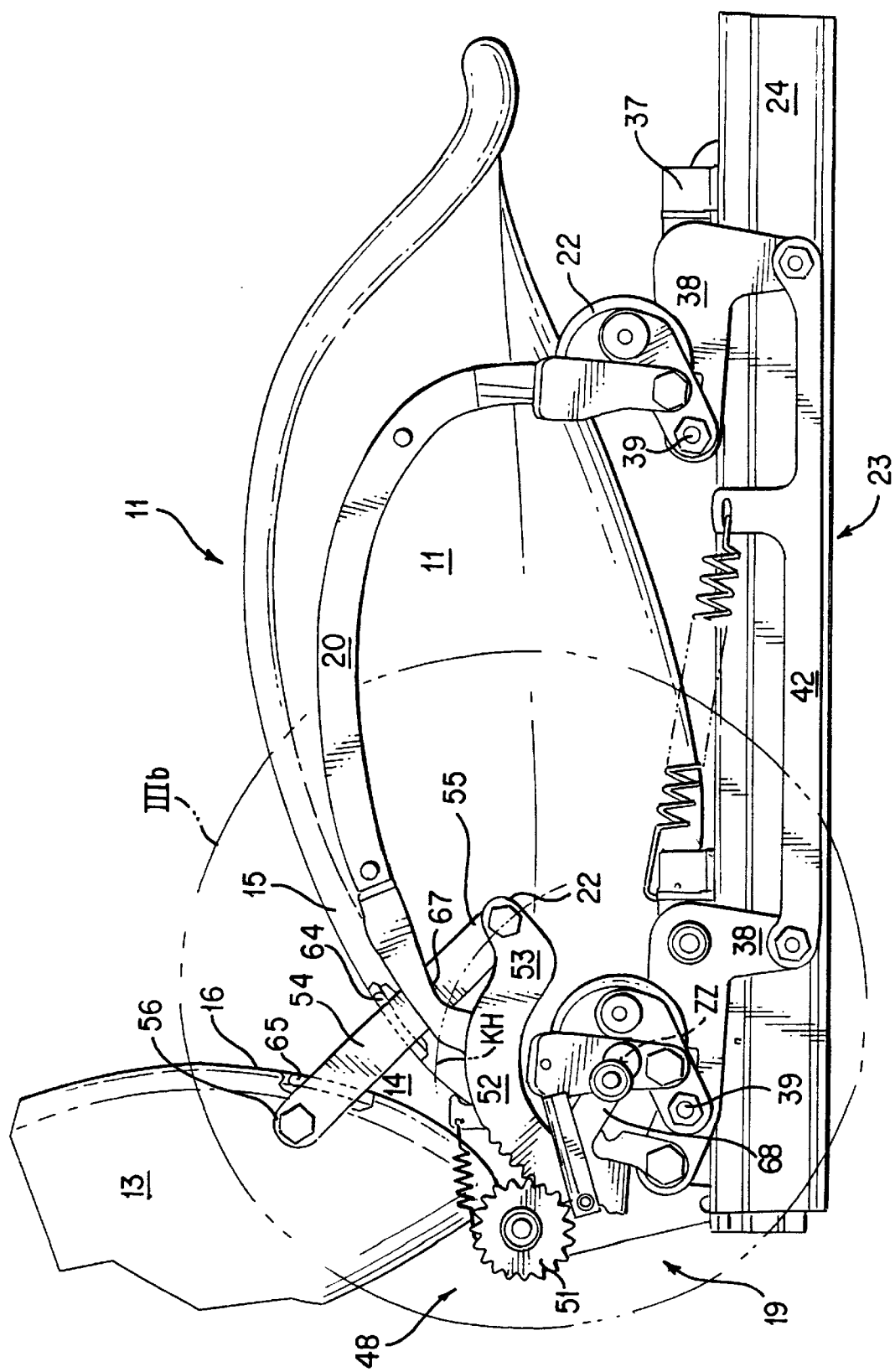
FIG. 3a is a side view of the seat part with a seat subframe of the vehicle seat according to the invention.

For driving and locking a shaft 36, the height adjusting arrangement 27 comprises a motor 34 and a transmission 35 which are fastened to one of the interior rails 29, 30. On a respective forward receiving device 37, the shaft 36 is rotationally disposed on the interior rails 29, 30. At the ends of the shaft 36, one angular crank 38 respectively is fastened as seen in FIG. 3a, at whose one leg end, the spiral springs 22 are swivellably disposed a respective screwed connection 39. On the rearward ends of the interior rails 29, 30, two rearward angular cranks 38 are swivellably disposed about an axis KA on rearward receiving devices 40.

As illustrated particularly in FIG. 3a, the shape of the rearward cranks 38 corresponds approximately to that of the forward cranks 38, in which the spiral springs 22 are swivellably disposed by a respective screwed connection 39 also on the respective one leg end of the rearward angular cranks 38. The other leg ends of the forward and rearward cranks 38, which are laterally assigned to one another, are connected with one another in an articulated manner by a linkage 42.

During an adjustment of the shaft 36, therefore not only the forward cranks 38 are swivelled but, by way of the linkage 42, also the rearward cranks 38. As a result, the four cranks 38 are synchronized, and a uniform height adjustment is obtained all four cranks 38. If the height adjustment of the forward cranks 38 is to take place separately of that of the rearward cranks 38, the linkage 42 will be unnecessary, in which case the rearward cranks 38 would then have to be driven separately by an additional motor and a additional shaft connecting the rearward cranks 38. If the two forward and the two rearward cranks 38 are driven by a separate forward and rearward motor, an inclination adjustment of the seat part 11 is also implemented.

The two lateral supporting yokes 20 are connected by two screws 44 respectively with the seat part 11. The two supporting yokes 20 are supported on the spiral springs 22 with a respective forward and a rearward end 45, 46. At the rearward end 46 of the supporting yokes 20, rearward receiving devices 47 are fastened on which a driving mechanism 48 of the backrest adjusting device 19 is fastened. The driving mechanism 48 has two motors 49 with a transmission 50 which are arranged laterally inside the interior rails 29, 30 and by way of which a left and a right driving pinion 51 are driven about an axis ZA.

A respective curved rack 52, which can be swivelled about its axis ZZ, engages with the two driving pinions 51. The rack 52 will be explained below in detail. At one end 53 of the respective curved toothed racks 52, an assigned control-arm-type lever 54 is arranged in an articulated manner. The two levers 54 are arranged mirror-symmetrically with respect to a vertical longitudinal center plane. A respective upper end 56 of the control-arm-type levers 54 is swivellably disposed on the respective assigned side cheek 18, 19 of the backrest part 13.

By operating the motors 49, by way of the toothed racks 52 and the levers 54, the backrest part 13 can therefore be adjusted in its inclination with respect to the seat part 11. Thereby, in which case the two transmissions 50 and thus also the two levers 54 are synchronized with one another by a shaft 57. The backrest part 13 is swiveled in the area of the bendable connection section 14 with respect to the seat part 11. The driving mechanism 48 with the lever 54 is at least in areas covered by a plastic covering. The driving mechanism 48 will be described with respect to FIGS. 3b to 4b below.

Figure 3B:
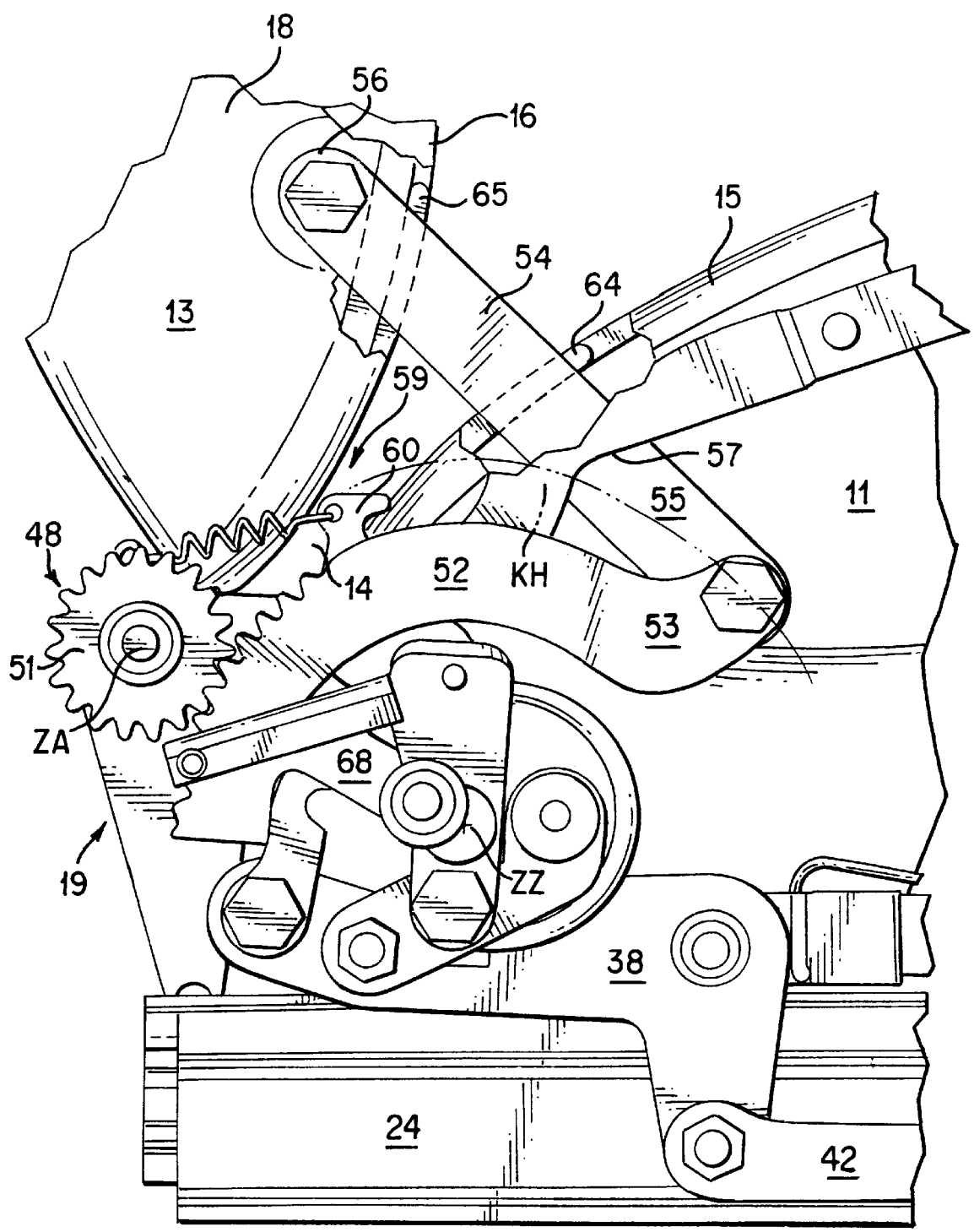

In addition, FIG. 2 shows a U-shaped frame 58 which causes the compression movement and the rebounding movement of the spiral springs 22 to be uniform. In the area of the rearward spiral springs 22, one locking mechanism 59 respectively, as seen in FIG. 3b, is provided so that, as required, the vibrational mobility of the seat part 11 with respect to the seat subframe 23 can largely be canceled. For this purpose, a respective toothed rack 60, as seen in FIG. 3b, is disposed at the rearward end of the cranks 54 which, as required, for example, in the event of an accident, can be caused to engage with corresponding locking devices 62 (FIG. 4b) at the rearward receiving devices 47 of the supporting yokes 20. Thus, a fixing of the seat part 11 at the seat subframe 23 is achieved.

FIGS. 3a and 3b are each a side view of the seat part 11 with the seat subframe 23 and the backrest adjusting device 19. FIG. 3b is an enlarged view of the driving mechanism 48 of the backrest adjusting device 19 according to the detail IIIb in FIG. 3a. The control-arm-type lever 54 passes through the lateral edge area 15 of the seat part 13 constructed as a U-shaped elevation through a passage opening 64 and passes through the lateral edge areas 16 of the backrest part 11 also constructed as a U-shaped elevation through a passage opening 65. Thus, with respect to the side contour of the seat part 11 formed by the U-shaped elevation, the lever 54 is arranged to be rebounding. In the illustrated embodiment, the upper end 56 of the lever 54 is linked on the outside to the side cheek 18 of the backrest part 13. The present invention also contemplates that the upper end 56 is arranged on the interior side of the edge area 16 of the backrest part 13. In addition, the lever 54 passes through the supporting yoke 20 in the area of a forking 67, as seen in FIG. 4a, whereby the swivelling movement of the backrest part 13 is limited toward the rear.

Figure 4B:
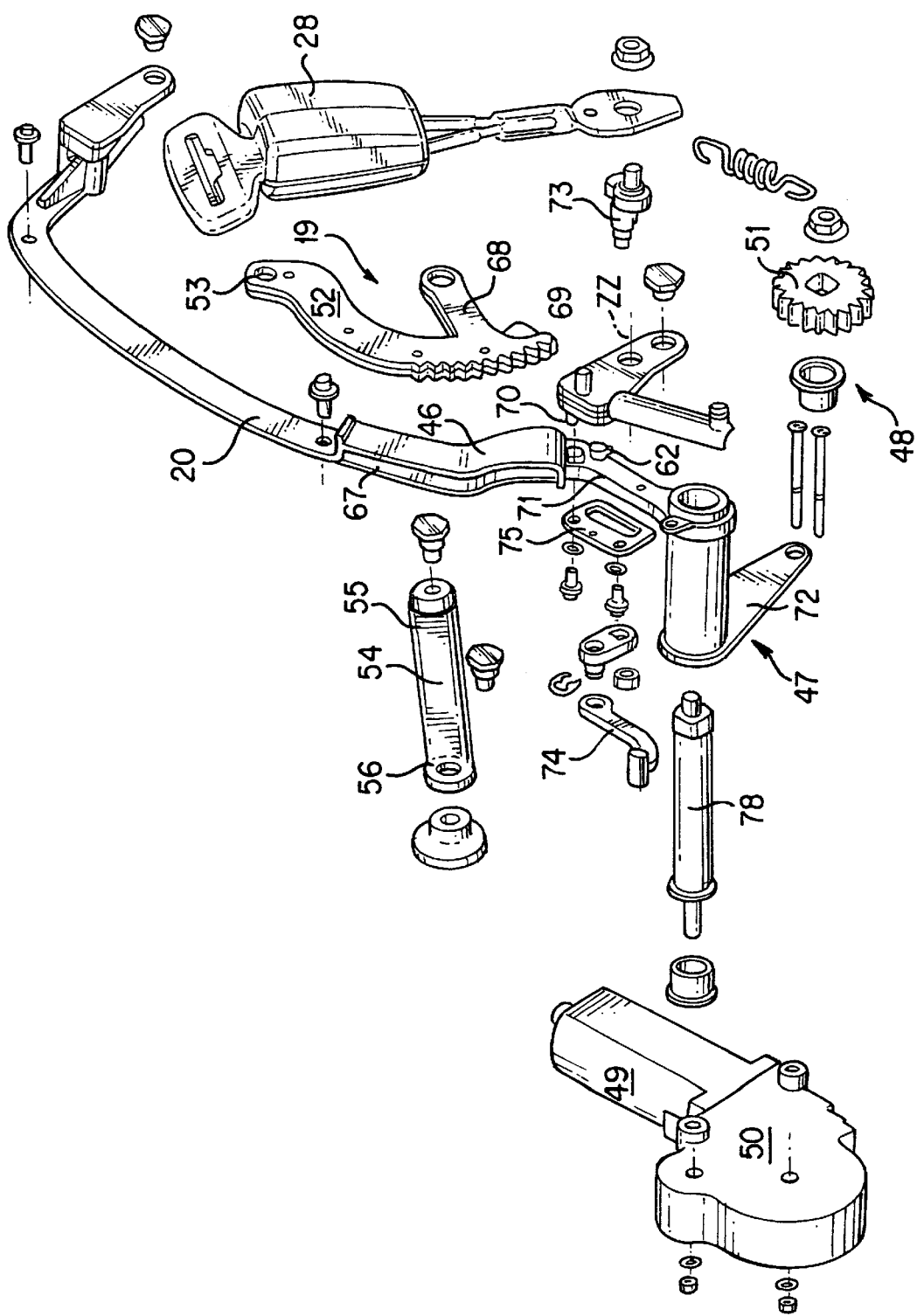

As illustrated particularly in connection with the perspective view and the exploded view of the backrest adjusting device 19 according to FIGS. 4a and 4b, the curved toothed rack 52 has a bearing section 68 which is connected therewith in one piece. Thereby, the toothed rack 52 is swivellable about the axis ZZ on a toothed rack receiving device 69 seen in FIG. 4b. The end 53 of the toothed rack 52 and the lower end 55 of the lever 54 linked thereto can therefore be displaced by the driving pinion along a moving path constructed here as a circular path KH. Likewise, it is conceivable to displace the lower end 55 can been displaced along an elliptical or linear moving path. The toothed rack receiving device 69 assigned to the rearward receiving device 47 is fastened by way of a connection section 70, seen in FIG. 4b, at a distance on an arm 71 which is fixed on the rearward end 46 of the supporting yoke 20. On the arm 71, a transmission receiving device 72 is fixedly arranged for fixing the transmission 50 to the supporting yoke 20. The gear wheel 51 is driven by a drive shaft 78 of the transmission 50 which is disposed within the transmission receiving device 72.

By way of a shaft lever 73 assigned to the locking mechanism 59, the buckle 28 is connected with a tension lever 74 which is guided within a connecting link 75. As the result of a belt force occurring at the buckle 28 in the event of a crash, the straight toothed rack 60, as seen in FIG. 3b of the locking mechanism 59 is moved forward by the tension lever 74 against a spring force. Thereby, the straight toothed rack 60 is caused to engage with the locking devices 62 on the arm 71, and the spiral spring 22 is therefore bridged by the straight toothed rack 60.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle seat, comprising a seat part, a backrest part swivellably arranged thereon and a backrest adjusting device for adjusting inclination of the backrest part, the backrest adjusting device comprising at least one element arranged in the transition area between the backrest part and the seat part and supported with an upper end thereof on the backrest part and with a lower end thereof on the seat part, and the at least one element being a control-arm-type lever having an upper end pivotally coupled to the backrest part and a lower end displaceable for adjusting the inclination of the backrest part by a driving mechanism along a circular-arc-shaped path between end positions, wherein an end of a curved toothed rack is linked to the lower end of the lever, and a driving pinion of the driving mechanism engages with the toothed rack, whereby the toothed rack is swivellable about a center point of the circular-arc-shaped path.

2. The vehicle seat according to claim 1, wherein the backrest adjusting device comprises two mirror-symmetrically arranged levers movable synchronously by the driving mechanism.

* * * * *